United States Patent
Harris et al.

(10) Patent No.: US 10,407,044 B2
(45) Date of Patent: Sep. 10, 2019

(54) METHOD FOR SUPPORTING CAR WASH MODE OF VEHICLES WITH INTERNAL ELECTRONIC TRANSMISSION RANGE SELECTION

(71) Applicant: GM GLOBAL TECHNOLOGY OPERATIONS LLC, Detroit, MI (US)

(72) Inventors: Shawn M Harris, Belleville, MI (US); Timothy R Stockdale, Brighton, MI (US); Mark S Reinhart, Oak Park, MI (US); Leanne F Giardini, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 15/678,192

(22) Filed: Aug. 16, 2017

(65) Prior Publication Data
US 2019/0054912 A1 Feb. 21, 2019

(51) Int. Cl.
| | |
|---|---|
| *B60W 10/06* | (2006.01) |
| *B60W 10/10* | (2012.01) |
| *B60W 10/04* | (2006.01) |
| *B60R 25/06* | (2006.01) |
| *B60R 25/04* | (2013.01) |
| *B60W 10/18* | (2012.01) |
| *F16H 61/22* | (2006.01) |
| *F16H 63/34* | (2006.01) |
| *F16H 63/48* | (2006.01) |

(52) U.S. Cl.
CPC .............. *B60W 10/04* (2013.01); *B60R 25/04* (2013.01); *B60R 25/06* (2013.01); *B60W 10/18* (2013.01); *F16H 61/22* (2013.01); *F16H 63/3483* (2013.01); *F16H 63/3491* (2013.01); *F16H 63/483* (2013.01)

(58) Field of Classification Search
CPC .... B60W 10/06; B60W 10/10; B60W 50/087; B60W 50/12
See application file for complete search history.

(56) References Cited

U.S. PATENT DOCUMENTS

| | | | | |
|---|---|---|---|---|
| 8,682,548 | B2 * | 3/2014 | Park | F16H 59/08 |
| | | | | 701/51 |
| 9,650,019 | B2 * | 5/2017 | Weston | B60T 7/12 |
| 2011/0132121 | A1 * | 6/2011 | Park | F16H 63/3466 |
| | | | | 74/473.12 |
| 2014/0052312 | A1 * | 2/2014 | Stadler | B60S 3/04 |
| | | | | 701/2 |
| 2014/0136060 | A1 * | 5/2014 | Deurloo | F16H 61/0204 |
| | | | | 701/51 |
| 2016/0186859 | A1 * | 6/2016 | Parker, Jr. | B60T 17/22 |
| | | | | 701/51 |

FOREIGN PATENT DOCUMENTS

| | | |
|---|---|---|
| DE | 112014003574 T5 | 4/2016 |
| DE | 102015208753 A1 | 11/2016 |

* cited by examiner

*Primary Examiner* — Edwin A Young

(57) ABSTRACT

A method for supporting car wash mode of a vehicle with internal electronic transmission range selection includes entering the vehicle into car wash mode with the engine off and the transmission in the Neutral position. Next, the method continues with monitoring the vehicle for misuse of car wash mode, and transitioning the vehicle transmission to Park from Neutral when misuse of car wash mode is detected.

20 Claims, 4 Drawing Sheets

METHOD FOR SUPPORTING CAR WASH MODE OF VEHICLES WITH INTERNAL ELECTRONIC TRANSMISSION RANGE SELECTION

FIELD

The present disclosure relates to a vehicle having internal electronic transmission range selection (ETRS), and more particularly to a method for supporting car wash mode of vehicles with internal ETRS.

BACKGROUND

The statements in this section merely provide background information related to the present disclosure and may or may not constitute prior art.

A typical multiple speed transmission uses a combination of torque transmitting devices and gear sets to achieve a plurality of driving modes that include a plurality of out-of-Park driving modes and a Park mode. The out-of-Park driving modes generally include forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

For internal ETRS vehicles, the vehicle needs a convenient way to be able to hold neutral for a calibrated time with the engine off in vehicles architected with a key based or a push button based ignition interface. This mode is referred to as car wash mode (CWM). It is important to know when CWM is in use and when misuse of CWM occurs.

SUMMARY

One or more exemplary embodiments address the above issue by providing a vehicle having internal electronic transmission range selection (ETRS), and more particularly to a method for supporting car wash mode of vehicles with internal ETRS.

According to aspects of an exemplary embodiment, a method for supporting car wash mode of vehicles with internal ETRS includes entering car wash mode for the vehicle. Another aspect includes monitoring the vehicle for misuse of car wash mode. And another aspect includes transitioning the vehicle transmission to park when misuse of car wash mode is detected.

Still another aspect of the exemplary embodiment wherein entering car wash mode further includes turning the engine off and placing the transmission in neutral. And another aspect includes recording when the vehicle enters car wash mode. And yet another aspect includes recording estimated distance traveled by the vehicle when it enters car wash mode. And still another aspect includes starting a car wash mode timer when entering car wash mode.

A further aspect of the exemplary embodiment includes monitoring vehicle speed when in car wash mode. Another aspect wherein monitoring further includes determining if the car wash mode timer is greater than a predetermined maximum car wash mode time threshold. And another aspect includes incrementing an overtime counter when the car wash mode timer is greater than a predetermined maximum car wash mode time threshold. Yet another aspect wherein monitoring further includes determining if the vehicle speed is greater than a predetermined speed threshold. And still another aspect includes incrementing an excessive speed counter when the vehicle speed is greater than the predetermined speed threshold.

Still another aspect of the exemplary embodiment includes recording estimated distance traveled at the most recent misuse event. And another aspect includes recording at least one other vehicle condition during the most recent misuse event. And yet further aspect wherein transitioning further includes transitioning to park when the vehicle speed is less than a predetermined low speed threshold after misuse is detected.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
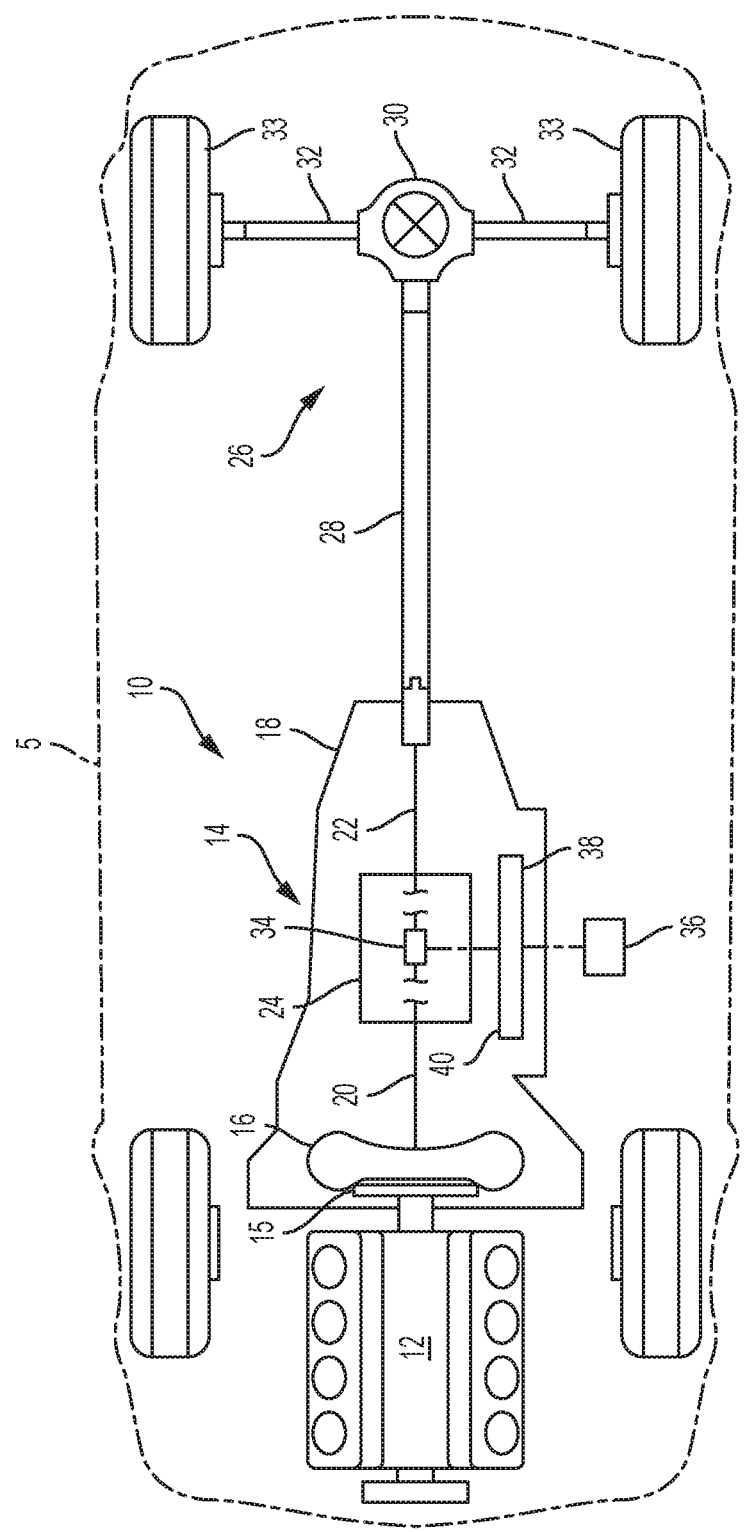
FIG. 1 is a schematic diagram of an exemplary powertrain in a motor vehicle in accordance with aspects of an exemplary embodiment.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, sport-utility vehicle, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, hybrid engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed including a dry launch clutch.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module (TCM), an engine control module (ECM), or a hybrid control module, or any other type of controller. The control module 36 is preferably an electronic control device having a preprogrammed digital computer or processor, control logic, memory used to store data, and at least one I/O peripheral. The control logic includes a plurality of logic routines for monitoring, recording, manipulating, and generating data. The control module 36 controls the actuation of the clutches/brakes 34 via a hydraulic control system 38.

The hydraulic control system 38 is disposed within a valve body 40 that contains most of the components of the hydraulic control system 38. These components include, but are not limited to, pressure regulation valves, directional valves, solenoids, etc. The valve body 40 may be attached to a bottom of the transmission housing 18 in the case of rear-wheel drive transmissions or attached to a front of the transmission housing 18 in the case of front-wheel drive transmissions. The hydraulic control system 38 is operable to selectively engage the clutches/brakes 34 by selectively communicating a hydraulic fluid from a sump (not shown) to a plurality of shift actuating devices (not shown). The hydraulic fluid is communicated to the shift actuating devices under pressure from either an engine or motor driven pump or an accumulator.

Figure 2:
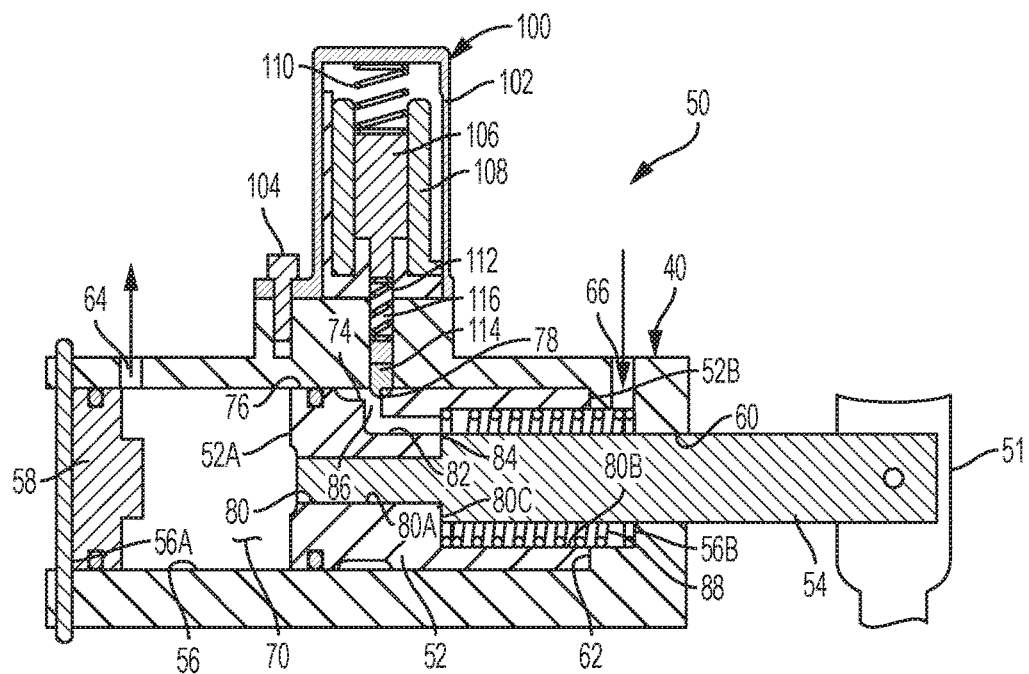
FIG. 2 is a schematic cross-sectional diagram of a valve integrated Park inhibition solenoid assembly in an out-of-Park position in accordance with aspects of the exemplary embodiment.

Turning to FIG. 2, a valve integrated Park inhibit solenoid assembly (VIPISA) for use in the hydraulic control system 38 is generally indicated by reference number 50. The VIPISA 50 is preferably employed in an electronic range selection (ETRS) subsystem within the transmission. The ETRS subsystem generally includes a plurality of servos, solenoids, valves, and a lever. An exemplary lever for use with the VIPISA 50 is generally indicated by reference number 51. The components of the ETRS system, including the lever 51, cooperate to shift the transmission between an out-of-Park mode that preferably includes a Neutral, forward, and reverse speed ratios and a Park mode. The Park mode is intended to prevent movement of the motor vehicle. The VIPISA 50 is operable to prevent the lever 51 from undesirably or unintentionally shifting between the out-of-Park mode and the Park mode.

The VIPISA 50 includes a servo piston 52 and rod 54 slidably disposed within a bore 56 of the valve body 40. A first end 56A of the bore 56 is closed by a plug or stopper 58 while a second end 56B of the bore 56 includes an opening 60. The bore 56 also includes a stop surface 62 disposed proximate the second end 56B. An out-of-Park fluid port 64 formed in the valve body 40 communicates with the bore 56 proximate the first end 56A while a back-to-Park fluid port 66 formed in the valve body 40 communicates with the bore 56 proximate the second end 56B.

The servo piston 52 is slidably disposed within the bore 56 between the ports 64 and 66 and cooperates with the bore 56 to define two fluid chambers: a first fluid chamber 70 in communication with the first fluid port 64 and a second fluid chamber 72 (see FIG. 3) in communication with the second fluid port 66. The servo piston 52 includes a first end 52A and a second end 52B opposite the first end 52A. The servo piston 52 includes a detent 74 located on an outer surface 76 of the servo piston 52. The detent 74 includes an angled front face 78. The detent 74 may be a single circumferential groove that extends along the entire circumference of the servo piston 52 or a plurality of discrete detents without departing from the scope of the present invention.

The servo piston 52 further includes a center, coaxial bore 80 having a first, small diameter portion 80A and a second, large diameter portion 80B. The first portion 80A extends from the first end 52A to a radial surface 80C located within the servo piston 52. The second portion 80B extends from the radial surface 80C to the second end 52B. A fluid channel 82 communicates from a port 84 in the radial surface 80C to a port 86 in the detent 74.

The rod 54 is coupled at one end to the servo piston 52 and at an opposite end to the lever 51. The rod 54 is press fit within the first portion 80A of the center bore 80 and extends out from the valve body 40 through opening 60. A biasing member or spring 88 is disposed around the rod 54 within the second portion 80B of the center bore 80. While the spring 88 is illustrated as a coiled spring in the present embodiment, it should be appreciated that any kind of biasing member may be employed without departing from the scope of the present invention. The spring 88 contacts the radial surface 80C and end 56B of the bore 56 in the valve body 40 to bias the servo piston 52 to a Park position (shown in FIG. 2).

The VIPISA 50 also includes a solenoid latching system 100 connected to the valve body 40 and operable to directly engage the servo piston 52. The solenoid latching system 100 includes a solenoid 102 attached by a fixed connection 104 to the valve body 40. Generally, the solenoid 102 includes an armature 106 surrounded by a solenoid coil 108. The solenoid coil 108 is selectively energizeable to produce a magnetic force to move the armature 106. An armature spring 110 is disposed at one end of the armature 106 to bias the armature 106 towards the servo piston 52. A tolerance spring 112 is located at an opposite end of the armature 106 between the armature 106 and a lock ball 114. The lock ball 114 is disposed within a passage 116 in the valve body 40 that communicates with the bore 56. The lock ball 114 selectively engages the detent 74 of the servo piston 52. In the example provided, the armature 106, springs 110 and 112, and the lock ball 114 are all coaxially aligned. Therefore the armature spring 110 biases and pre-sets the lock ball 114 towards the detent 74 of the servo piston 52. The tolerance spring 112 at its free height preferably overtakes the armature spring 110. It should be appreciated that the lock ball 114 may be a ball bearing, roller, or formed end of a plunger without departing from the scope of the present invention.

Figure 3:
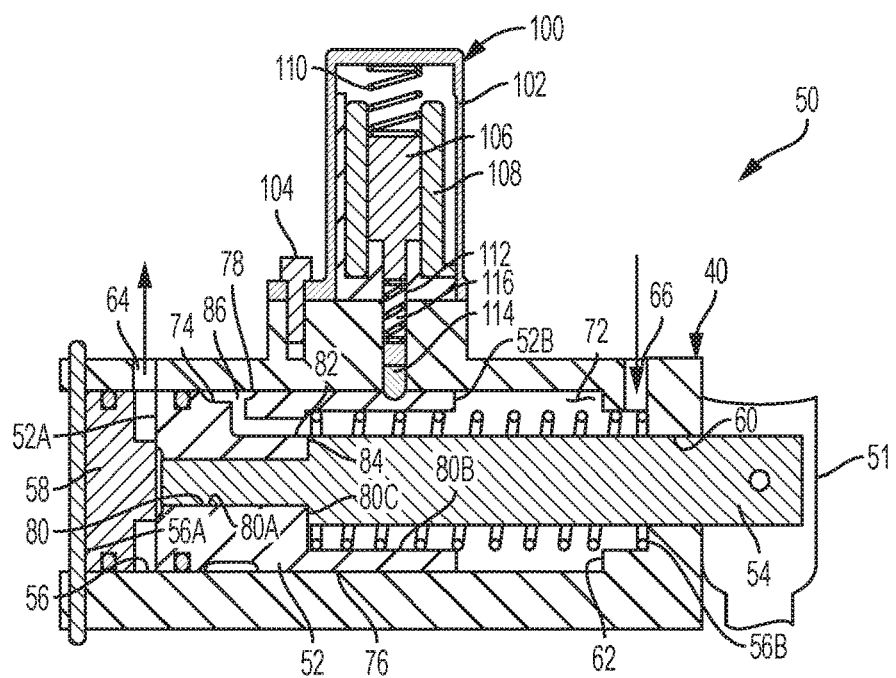
FIG. 3 is a schematic cross-sectional diagram of the valve integrated Park inhibition solenoid assembly in a Park position in accordance with aspects of the exemplary embodiment.

During operation, the lever 51 is moved by the ETRS system between the out-of-Park position, shown in FIG. 2, and the Park position shown in FIG. 3. Movement of the servo piston 52 between out-of-Park and Park positions in turn moves the lever 51. However the VIPISA 50 is operable to selectively lock the lever 51 in the out-of-Park position, shown in FIG. 2, by engagement of the solenoid latching assembly 100. For example, in the out-of-Park locked condition, the solenoid 102 is activated and the armature 106 pushes the lock ball 114 into the detent 74 of the servo piston 52. The lock ball 114 reacts against the angled face 78 of the detent 74 to prevent the servo piston 52 from translating. To unlock the servo piston 52, the solenoid 102 is de-energized and the servo piston 52 moves to the left due to the bias of the spring 88 and movement of the lever 51. As the servo piston 52 translates, the lock ball 114 rides up the angled face 78 of the detent 74 and enters the passage 116, shown in FIG. 3. In addition, hydraulic fluid from the ETRS system enters fluid chamber 72 via port 66, enters the servo piston 52, and communicates through the fluid passage 82 to contact the locking ball 114. In the event that the armature 106 has failed and locked, this hydraulic fluid pressure acts on the locking ball 114 and moves the locking ball 114 against the bias of the tolerance spring 112 to an unlocked condition, thus allowing the VIPISA 50 to return to Park. To return to the out-of-Park condition, the servo piston 52 moves the lever 51 while hydraulic fluid from the ETRS system enters the first fluid chamber 70 via fluid port 64 and contacts the servo piston 52 to assist in the movement of the servo piston 52 to the out-of-Park condition.

Figure 4:
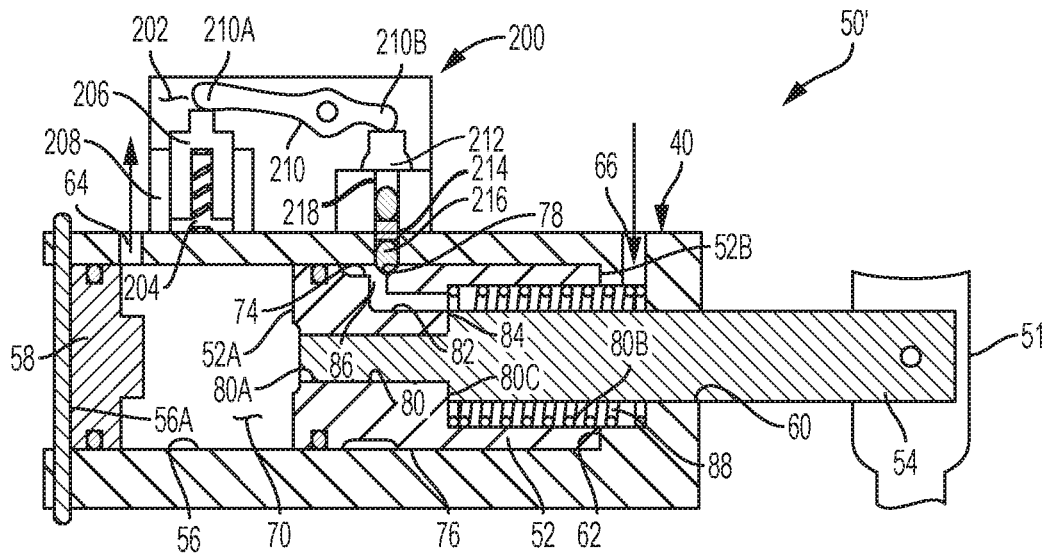
FIG. 4 is a schematic cross-sectional diagram of an alternate embodiment of a valve integrated Park inhibition solenoid assembly in an out-of-Park position in accordance with aspects of the exemplary embodiment.
Figure 5:
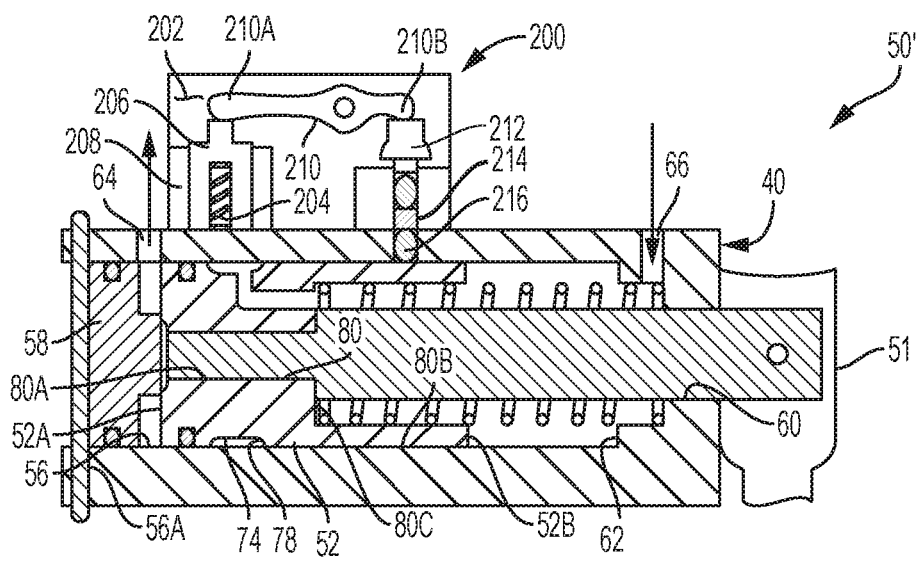
FIG. 5 is a schematic cross-sectional diagram of the alternate embodiment of the valve integrated Park inhibition solenoid assembly in a Park position in accordance with aspects of the exemplary embodiment.

Turning to FIGS. 4 and 5, an alternate embodiment of a VIPISA is shown and generally indicated by reference number 50'. The VIPISA 50' is substantially similar to the VIPISA 50 shown in FIGS. 2 and 3 and like components are indicated by like reference numbers. However, the VIPISA 50' includes a mechanically assisted solenoid latching assembly 200. The mechanically assisted solenoid latching assembly 200 operates in a manner similar to that of the solenoid latching assembly 100 to selectively lock the servo piston 52 in the out-of-Park (in this case Neutral) mode when the engine is turned off to enter the car wash mode (CWM). The mechanically assisted solenoid latching assembly 200 includes a solenoid 202 attached to the valve body 40. Generally, the solenoid 202 includes an armature 206 surrounded by a solenoid coil 208. The solenoid coil 208 is selectively energizeable to produce a magnetic force to move the armature 206 upward when the engine is turned off. An armature spring 204 is disposed at one end of the armature 206 to bias the armature 206 away from the valve body 40. The mechanically assisted solenoid latching assembly 200 further includes a lever 210 that mechanically assists the armature 206. The lever 210 includes a first lever arm 210A that contacts the armature 206 and a second lever arm 210B that contacts a piston 212. The first lever arm 210A is preferably longer than the second lever arm 210B. The piston 212 is in contact with a tolerance spring 214 disposed between the piston 212 and a lock ball 216. The lock ball 216 is disposed within a passage 218 in the valve body 40 that communicates with the bore 56. The lock ball 216 selectively engages the detent 74 of the servo piston 52. The armature 206 and armature spring 204 are coaxially aligned while the piston 212, the tolerance spring 214, and the lock ball 216 are coaxially aligned. Therefore the armature spring 204 biases and pre-sets the lock ball 216 through the lever 210 and the piston 212 towards the detent 74 of the servo piston 52. FIG. 4 illustrates the VIPISA 50' in an out-of-Park mode (in this case Neutral or CWM when solenoid coil 208 is selectively energized) while FIG. 5 illustrates the VIPISA 50' in a Park mode when the solenoid coil 208 is de-energized. In yet another embodiment, the VIPISA 50' may omit the armature spring 204 such that the mechanically assisted solenoid latching assembly 200 does not pre-stage the lock ball 216. The tolerance spring 214 at its free height preferably overtakes the armature spring 204.

Figure 6:
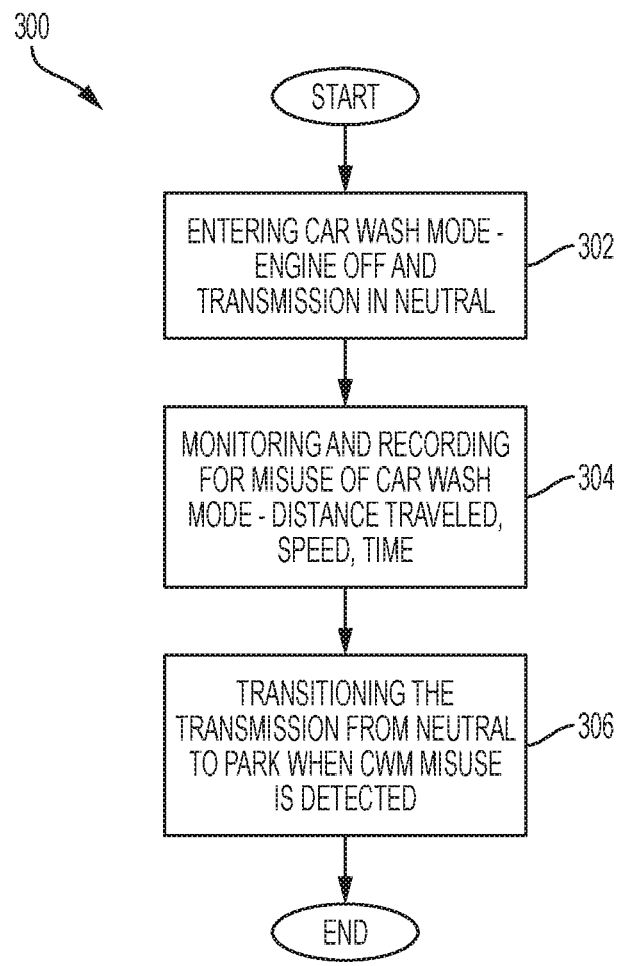
FIG. 6 is an algorithm of a method for supporting car wash mode of vehicles with internal ETRS in accordance with aspects of the exemplary embodiment.

Referring now to FIG. 6, an algorithm 300 of a method for supporting car wash mode of vehicles with internal ETRS in accordance with aspects of the exemplary embodiment is provided. The method begins at block 302 with entering the vehicle into car wash mode. Car wash mode at least includes turning off the vehicle's engine and placing the vehicle transmission in Neutral position. With the engine shut off, no hydraulic pressure is available but the mechanical interference of the VIPISA solenoid prevents the components of the valve body from actuating from the out of Park (Neutral) position.

At block 304, the method continues with monitoring the vehicle for misuse of car wash mode. Monitoring the vehicle for misuse of car wash mode further includes recording when the vehicle enters car wash mode; recording the estimated distance traveled by the vehicle when it enters car wash mode; starting a car wash mode timer when entering car wash mode and incrementing an overtime counter when the car wash mode timer is greater than a predetermined maximum car wash mode time threshold; monitoring the vehicle speed while in car wash mode, determining when the vehicle speed is greater than a predetermined speed threshold, and incrementing an excessive speed counter when the vehicle speed is greater than the predetermined speed threshold.

The method also includes recording the estimated distance traveled at the most recent misuse event and recording at least one other vehicle condition, e.g., ignition switch position, during the most recent misuse event. Preferably, all of the recorded information is stored in the TCM, or other control module, for subsequent retrieval and analysis by service personnel.

Next, at block 306, the method continues with transitioning the vehicle transmission to Park when misuse of car wash mode is detected. Transitioning to Park includes detecting when any form of misuse is determined and transitioning the transmission from Neutral to Park when the vehicle speed becomes less than a predetermined low speed threshold after the misuse, e.g., vehicle speed greater than the predetermined speed threshold.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for supporting car wash mode of a vehicle with internal electronic transmission range selection comprising:
   entering car wash mode for the vehicle;
   monitoring the vehicle for misuse of car wash mode; and
   transitioning the vehicle transmission to park when misuse of car wash mode is detected.

2. The method of claim 1 wherein entering car wash mode further comprises turning engine off and placing transmission in neutral.

3. The method of claim 1 further comprising recording when the vehicle enters car wash mode.

4. The method of claim 1 further comprising recording estimated distance traveled by the vehicle when it enters car wash mode.

5. The method of claim 1 further comprising starting a car wash mode timer when entering car wash mode.

6. The method of claim 5 wherein monitoring further comprises determining if the car wash mode timer is greater than a predetermined maximum car wash mode time threshold.

7. The method of claim 6 further comprising incrementing an overtime counter when the car wash mode timer is greater than a predetermined maximum car wash mode time threshold.

8. The method of claim 1 further comprising monitoring vehicle speed when in car wash mode.

9. The method of claim 8 wherein monitoring further comprises determining if the vehicle speed is greater than a predetermined speed threshold.

10. The method of claim 9 further comprising incrementing an excessive speed counter when the vehicle speed is greater than the predetermined speed threshold.

11. The method of claim 1 further comprising recording estimated distance traveled at the most recent misuse event.

12. The method of claim 11 further comprising recording at least one other vehicle condition during the most recent misuse event.

13. The method of claim 1 wherein transitioning further comprises transitioning to park when the vehicle speed is less than a predetermined low speed threshold after misuse is detected.

14. A method for supporting car wash mode of a vehicle with internal electronic transmission range selection comprising:
    entering car wash mode for the vehicle, wherein car wash mode includes engine off and transmission in neutral;
    recording when the vehicle enters car wash mode;
    monitoring the vehicle for misuse of car wash mode; and
    transitioning the vehicle transmission to park when misuse of car wash mode is detected.

15. The method of claim 14 further comprising recording estimated distance traveled by the vehicle when it enters wash mode.

16. The method of claim 14 further comprising starting a car wash mode timer when entering car wash mode.

17. The method of claim 14 further comprising monitoring vehicle speed when in car wash mode.

18. A method for supporting car wash mode of a vehicle with internal electronic transmission range selection comprising:
    entering car wash mode for the vehicle, wherein car wash mode includes engine off and transmission in neutral;
    recording when the vehicle enters car wash mode;
    recording estimated distance traveled by the vehicle when it enters wash mode;
    starting a car wash mode timer when in car wash mode;
    monitoring the vehicle for misuse of car wash mode; and
    transitioning the vehicle transmission to park when misuse of car wash mode is detected.

19. The method of claim 18 further comprising monitoring vehicle speed when in car wash mode.

20. The method of claim 18 wherein monitoring further comprises determining if the car wash mode timer is greater than a predetermined maximum car wash mode time threshold.

* * * * *